US012246280B2

(12) United States Patent
Jeon

(10) Patent No.: US 12,246,280 B2
(45) Date of Patent: Mar. 11, 2025

(54) AIR CLEANING APPARATUS WITH A MOIST FILTER

(71) Applicant: WATERVATION CO., LTD., Cheonan-si (KR)

(72) Inventor: Pil-Dong Jeon, Seoul (KR)

(73) Assignee: WATERVATION CO., LTD., Cheonan-si (KR)

( * ) Notice: Subject to any disclaimer, the term of this patent is extended or adjusted under 35 U.S.C. 154(b) by 252 days.

(21) Appl. No.: 15/984,652

(22) Filed: May 21, 2018

(65) Prior Publication Data

US 2018/0339258 A1    Nov. 29, 2018

(30) Foreign Application Priority Data

May 29, 2017 (KR) .................. 10-2017-0066166
Jun. 22, 2017 (KR) .................. 10-2017-0079203

(51) Int. Cl.
| | | |
|---|---|---|
| *B01D 47/02* | (2006.01) | |
| *B01D 47/08* | (2006.01) | |
| *B05B 3/02* | (2006.01) | |
| *B05B 3/08* | (2006.01) | |
| *B05B 7/00* | (2006.01) | |
| *F24F 8/117* | (2021.01) | |
| *F24F 8/125* | (2021.01) | |

(52) U.S. Cl.
CPC ........... *B01D 47/02* (2013.01); *B01D 47/085* (2013.01); *B05B 3/082* (2013.01); *B05B 7/0075* (2013.01); *F24F 8/125* (2021.01); *B01D 2247/14* (2013.01); *B01D 2273/30* (2013.01); *F24F 8/117* (2021.01)

(58) Field of Classification Search
CPC ............ B01D 46/0005; B01D 46/2411; B01D 46/008; B01D 46/0031; B01D 46/0004; B01D 46/24; B01D 46/4254; B01D 46/003; B01D 47/02; B01D 47/085; B01D 2247/14; B01D 2273/30; B05B 7/0075; B05B 3/082; F24F 3/1603; F24F 2003/1617
USPC ....... 55/508, 471–473, 497; 96/416; 422/82, 422/90, 114
See application file for complete search history.

(56) References Cited

U.S. PATENT DOCUMENTS

| | | | | |
|---|---|---|---|---|
| 5,624,639 A | * | 4/1997 | Ariga ..................... | B60H 1/008 422/83 |
| 5,752,997 A | * | 5/1998 | Roth ...................... | A47L 9/181 96/342 |

(Continued)

*Primary Examiner* — Minh Chau T Pham
(74) *Attorney, Agent, or Firm* — Bridgeway IP Law Group, PLLC; Jihun Kim

(57) ABSTRACT

An air cleaning apparatus with a moist filter is disclosed. More particularly, the present invention relates to an air cleaning apparatus with a moist filter, being operated such that: water stored in a bottom reservoir tank flows upward in a centrifugal manner; water molecules are finely cleaved in a microfine state and injected through multiple injection holes in the same centrifugal manner to become moist; under such conditions, water flowing into a rotational column, to which a centrifugal force is applied, is filtered while circulating a cycle wherein external air inflowing through air input holes formed below a moist layer is adhered to water molecules in the moist layer and drops down, thereby enabling ultrafine dust as well as fine dust to be filtered with high efficiency and excellent economic advantage.

9 Claims, 8 Drawing Sheets

(56) References Cited

U.S. PATENT DOCUMENTS

| | | | |
|---|---|---|---|
| 2014/0083299 A1* | 3/2014 | Yamase | B01D 46/0005 96/416 |
| 2014/0144110 A1* | 5/2014 | Wood | A62B 19/00 55/482 |
| 2017/0122586 A1* | 5/2017 | Son | F24F 6/04 |
| 2017/0122587 A1* | 5/2017 | Son | B01F 23/2132 |
| 2017/0122588 A1* | 5/2017 | Lee | F24F 6/06 |
| 2017/0122601 A1* | 5/2017 | Lee | F24F 11/30 |
| 2017/0122602 A1* | 5/2017 | Son | F24F 3/16 |
| 2017/0122603 A1* | 5/2017 | Kim | B01D 46/0035 |
| 2017/0122605 A1* | 5/2017 | Lee | F24F 3/16 |

* cited by examiner

AIR CLEANING APPARATUS WITH A MOIST FILTER

CROSS-REFERENCE TO PRIOR APPLICATIONS

This application claims the benefit of foreign priority of Korean Patent Application No. 10-2017-0066166 (filed May 29, 2017), Application No. 10-2017-0079203 (filed Jun. 22, 2017), Application No. 10-2017-0107215 (filed Aug. 24, 2017), and Application No. 10-2018-0032915 (filed Mar. 21, 2018), the subject matters of which are hereby incorporated by reference in its entirety.

BACKGROUND OF THE INVENTION

1. Field of the Invention

The present invention relates to an air cleaning apparatus with a moist filter, more particularly, to an air cleaning apparatus with a moist filter, being operated such that water stored in a bottom reservoir tank flows upward in a centrifugal manner; water molecules are finely cleaved in a microfine state and injected through multiple injection holes in the same centrifugal manner to become moist; under such conditions, water flowing into a rotational column, to which a centrifugal force is applied, is filtered while circulating a cycle wherein external air inflowing through air input holes formed below a moist layer is adhered to water molecules in the moist layer and drops down, thereby enabling fine particulate matter ('ultrafine dust') as well as fine dust to be filtered with high efficiency and excellent economic advantage.

2. Description of the Related Art

As is well known in the art, because of advanced development of industries, people suffer from air pollution all around the world in recent years. Especially, a nearby country, that is, China, is now actively industrialized, which in turn causes deterioration in air quality inside the country. Further, due to global warming that has become a worldwide issue, soil becomes dry, causing very fast desertification in China.

For this reason, yellow dust typically has a great influence upon domestic air quality in the spring, and is now affecting the domestic air quality in and out of season throughout the year.

In particular, due to fine dust that contains industrial pollutants and blows together with the yellow dust toward our country in recent years, damage caused by the same is rapidly increasing.

Accordingly, different apparatuses for eliminating such fine dust as described above have developed to remove the same if the fine dust comes indoors.

However, conventional methods for eliminating fine dust are still within an existing framework of simple dust collection, and therefore, efficiency of fine dust elimination is also the same as that achieved by existing dust collection techniques.

With respect to collection of fine dust, most foreign-affiliated companies and even the leading companies in Korea have adopted an air cleaning system using a filter. Such a filtration method is merely filtration of visible dust and substantially does not function to filter ultrafine dust or nanometer-scale dust, which are very harmful to the human body. Further, since the contaminated filter itself is usually considered as industrial waste, development of a novel and more effective filtering means is now required.

An air cleaning enterprise in Germany, Venta & Luftwascher GmbH, and the leading domestic companies such as SAMSUNG Electronics and LG Electronics have also reported experimental results, as a solution to overcome fine dust problems, such that the fine dust could be removed using water. However, if using a method of compressing and injecting water in a spray manner after lifting the water upward through a motor pump, manufacturing costs are quite high and noise of the motor pump may not be eliminated, thus causing a problem of requiring multilayer soundproofing or a sound absorption means.

Likewise, even in Germany or Japan, the above problem has yet to be solved. Consequently, apparatuses with disadvantages such as high price, large volume and noise generation, have currently been released and/or introduced. For the above reasons, there is still a problem that the air cleaning apparatus cannot be miniaturized.

SUMMARY OF THE INVENTION

Therefore, the present invention has been made in view of the above problems, and it is an object of the present invention to provide an air cleaning apparatus with a moist filter, which is operated such that:

water stored in a bottom reservoir tank flows upward in a centrifugal manner, and water molecules are finely cleaved in a microfine state and injected through multiple injection holes in the same centrifugal manner to become moist;

under such conditions, water flowing into a rotational column, to which centrifugal force is applied, is filtered while circulating a cycle wherein external air inflowing through air input holes formed below a moist layer is adhered to water molecules in the moist layer and drops down, thereby enabling ultrafine dust as well as fine dust to be filtered with high efficiency and excellent economic advantage.

In accordance with one embodiment of the present invention, the above and other objects can be accomplished by the provision of an air cleaning apparatus with a moist filter, which includes: a lower body 6 that is formed in a barrel shape and has a reservoir tank 18 at the bottom of the same; a rotational column 30 that is coupled at a predetermined portion in the center of the lower body 6 to be rotatably mounted, lifts water stored in the reservoir tank 18 upward in a centrifugal manner and then scatters the same to form a moist layer 20; a screen barrel 8 coupled to a top portion of the lower body 6 while enclosing an outer part of the rotational column 30; and an upper body 4 that is coupled to the top portion of the lower body 6 while enclosing an outer part of the screen barrel 8, has a rotational fan 50 exhausting internal air to the outside and a motor 48 mounted on the inner center, and includes multiple air vents 10 formed on a top surface thereof.

Preferably, the air cleaning apparatus with a moist filter according to the present invention includes an air input hole-punch band 16 formed around an outer periphery on top of the lower body 6 wherein multiple air input holes 14 are punched through the punch band.

Preferably, with regard to the air cleaning apparatus with a moist filter according to the present invention, the upper body 4 further includes an operational panel 12 which has a power button, a speed set-up button to set a desired motor revolution rate ('rpm'), and a water shortage indicator LED to indicate lack of water stored in the reservoir tank 18; and the reservoir tank 18 further includes a water level sensor to detect a low level of the stored water in the reservoir tank 18.

Preferably, with regard to the air cleaning apparatus with a moist filter according to the present invention, a top end of the rotational column 30 is coupled with a bottom end of the rotational fan 50 by first and second couplers 44 and 52, so as to simultaneously rotate both the rotational column and the rotational fan by rotary power of the motor 48.

Preferably, with regard to the air cleaning apparatus with a moist filter according to the present invention, the rotational column 30 lifts the water in the reservoir tank 18 upward while rotating, and includes:

a water supply vessel 32 that has water input holes 33 punched at a predetermined portion on a top end of the water supply vessel, and has an engaging shoulder formed around the outer periphery in a middle part of the water supply vessel, to which an injection column 38 is coupled and engaged;

the injection column 38 that is engaged around an outer periphery on an upper part of the water supply vessel 32, and has multiple injection holes 40 formed around an outer periphery of the injection column 38; and a top cover 43 coupled to the top end of the water supply vessel 32 to fix the injection column 38, wherein an additional reservoir 36 is further provided between the water supply vessel 32 and the injection column 38, a water supply pipe 34 is mounted to pass through a bottom surface of the water supply vessel 32 wherein a top end of the water supply pipe 34 is bent in a ']' shape.

Preferably, with regard to the air cleaning apparatus with a moist filter according to the present invention, the screen barrel 8 includes: a receiving part in a circular band shape around an inner periphery on the bottom of the screen barrel 8, wherein sprayed water falling along the inner periphery from the upper part is received in the receiving part; and a guiding track 24 connected to the receiving part 22 to guide the water toward the center of the reservoir tank 18.

Preferably, the air cleaning apparatus with a moist filter according to the present invention includes a filter 42 disposed at a predetermined portion in the center of the reservoir tank 18 wherein a bottom end of the water supply pipe 34 is inserted into and housed in the filter.

Preferably, with regard to the air cleaning apparatus with a moist filter according to the present invention, a gap between the water supply vessel 32 and the injection column 38 is 0.5 mm.

Effects of Invention

The air cleaning apparatus with a moist filter according to the present invention uses an inner rotational column in a centrifugal manner and may moisturize water molecules without any alternative motor pump, and therefore, can achieve excellent economic advantages and reduction of noise. Further, the air cleaning apparatus of the present invention may pass air containing fine dust through a moist layer to execute first filtering, followed by second filtering through a cycle of circulating the water adhered to moisture toward the rotational column via a reservoir tank, thereby achieving high efficiency of removing pollutants according to multi-filtering performance. Further, the air cleaning apparatus of the present invention may also have high safety with improved humidification performance since humidification is performed using clean moisture free of pollutant.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the present invention will be described in detail with reference to the accompanying drawings.

Figure 1:
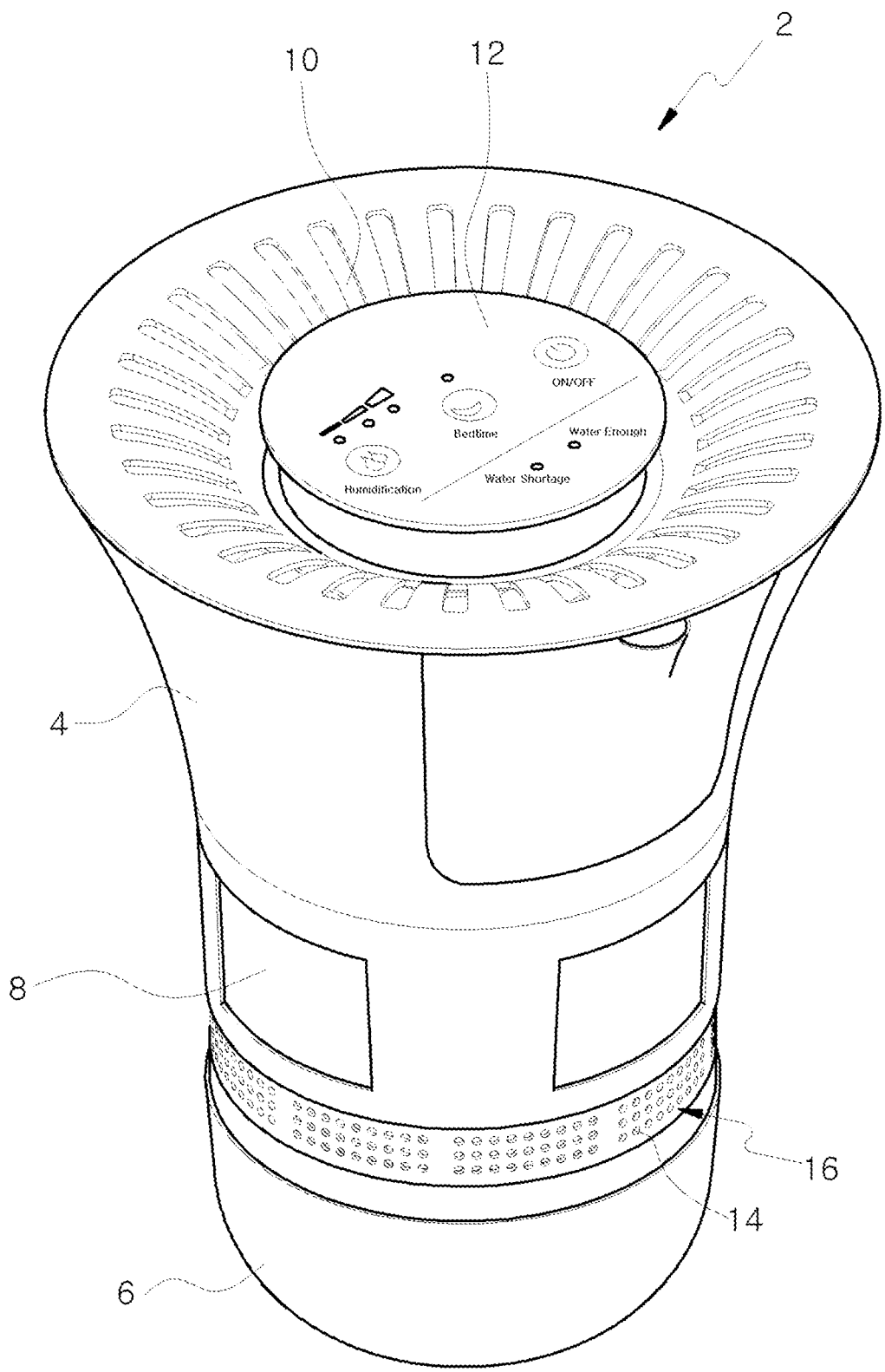
FIG. 1 is a perspective view illustrating an outward appearance of the air cleaning apparatus with a moist filter according to one embodiment of the present invention.
Figure 2:
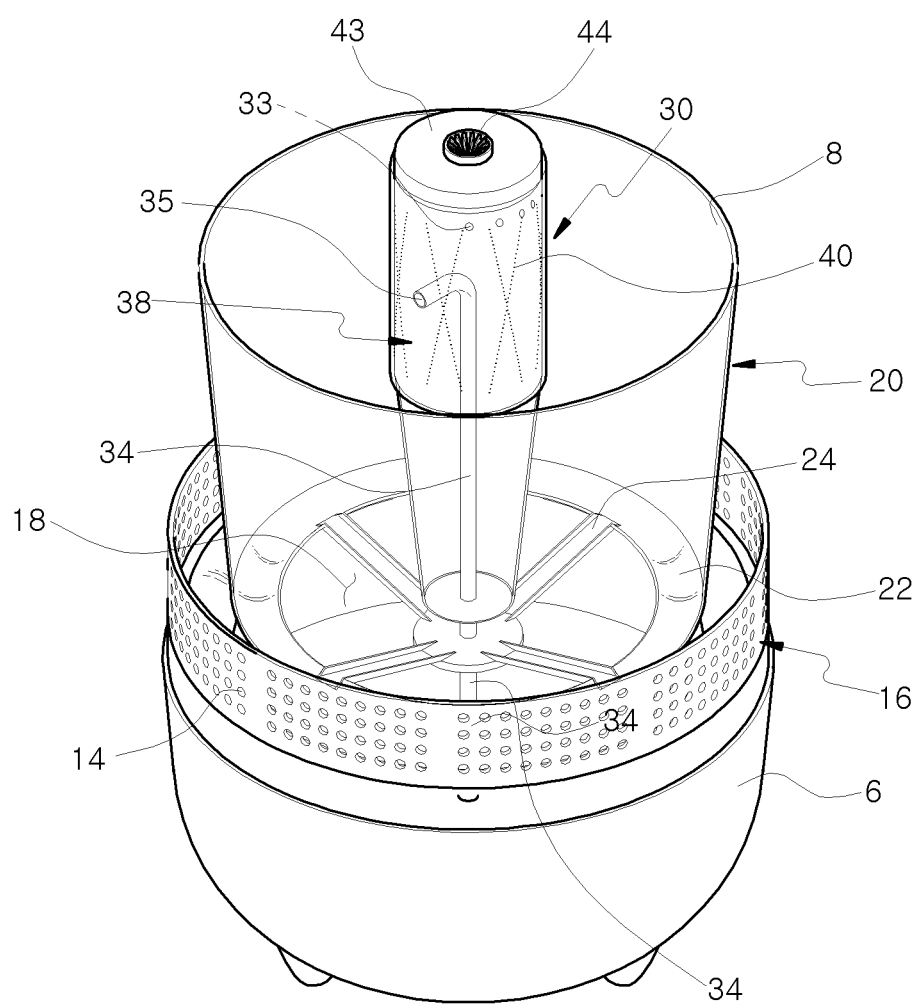
FIG. 2 is a perspective view illustrating an internal configuration of the air cleaning apparatus with a moist filter according to one embodiment of the present invention.
Figure 3:
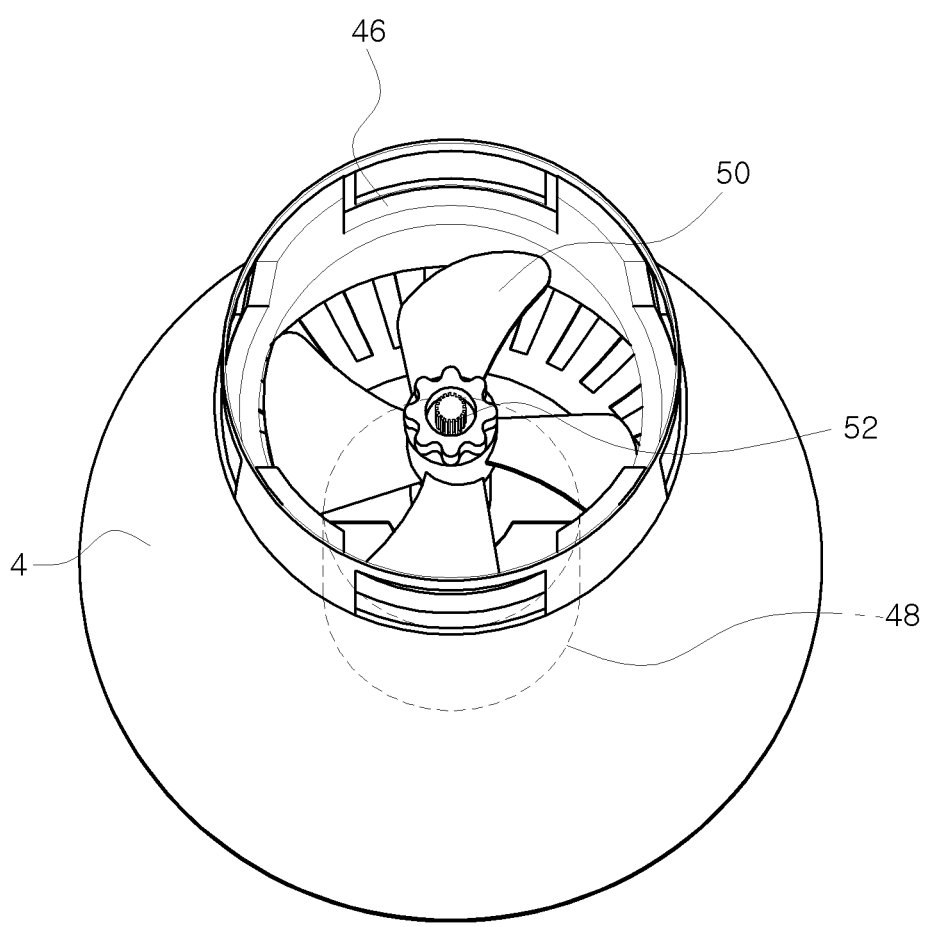
FIG. 3 is a perspective view illustrating an upper body of the air cleaning apparatus with a moist filter according to one embodiment of the present invention, which is turned upside down.
Figure 4:
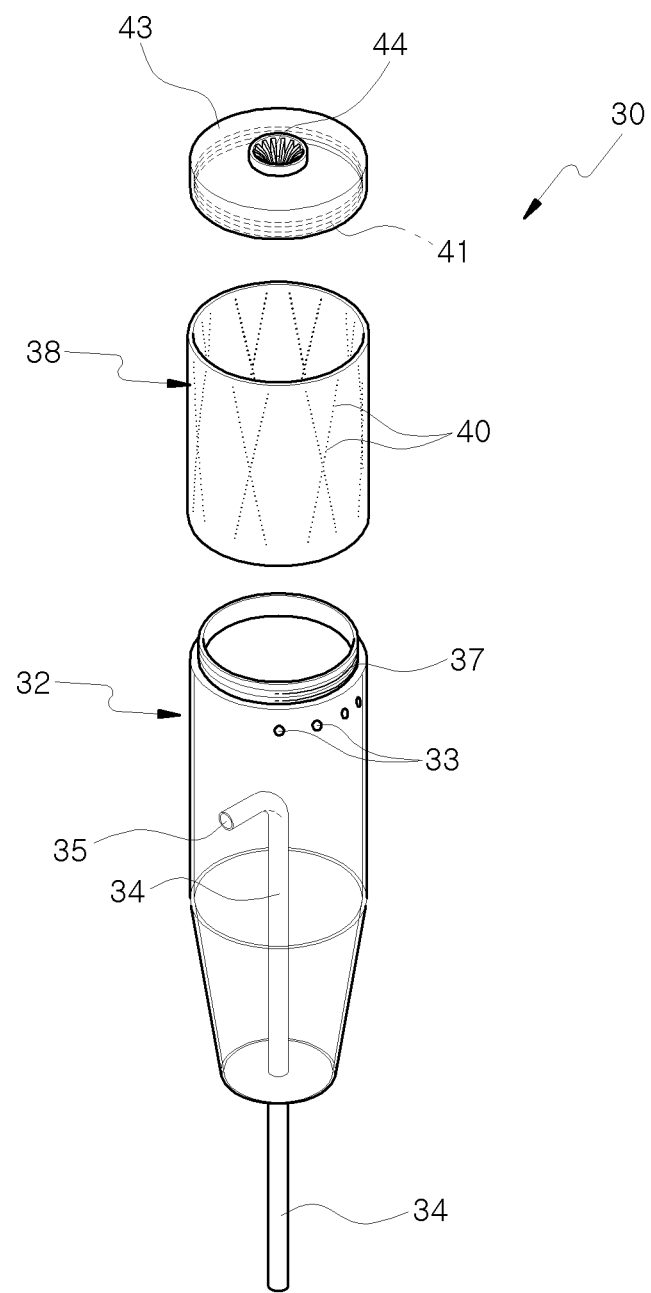
FIG. 4 is an enlarged exploded view illustrating a configuration of a rotational column included in the air cleaning apparatus with a moist filter according to one embodiment of the present invention.
Figure 5:
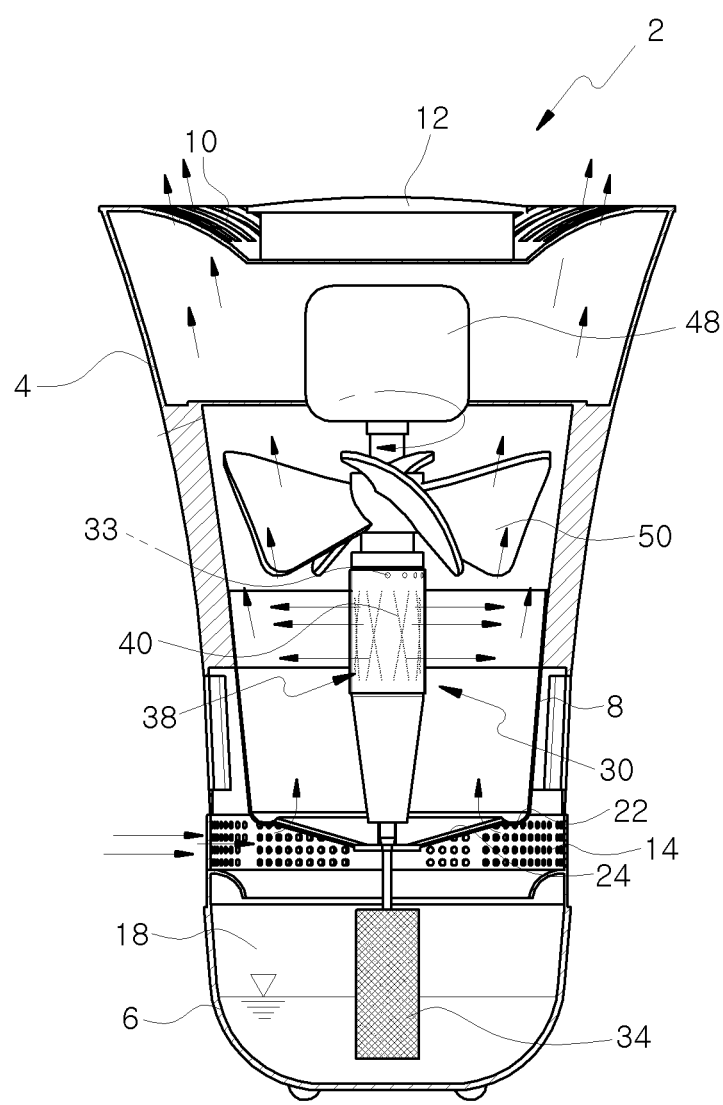
FIG. 5 is a longitudinal front-sectional view illustrating the air cleaning apparatus with a moist filter according to one embodiment of the present invention.
Figure 6:
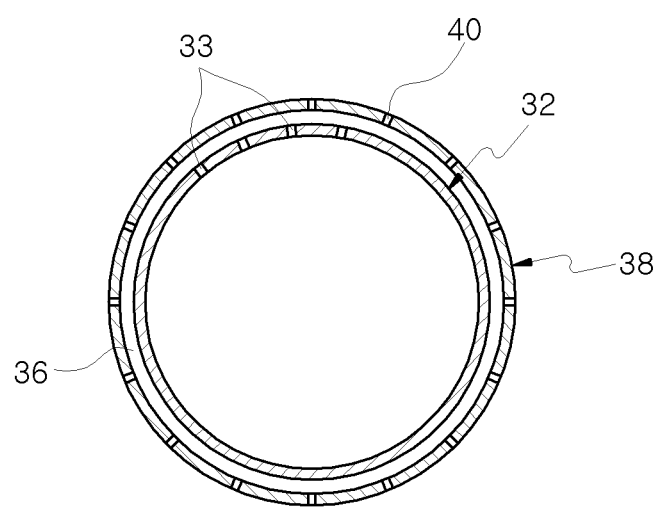
FIG. 6 is a transverse cross-sectional view illustrating a coupling condition of a water supply vessel and an injection column included in the air cleaning apparatus with a moist filter according to one embodiment of the present invention.

FIG. 1 is a perspective view illustrating an outward appearance of the air cleaning apparatus with a moist filter according to one embodiment of the present invention; FIG. 2 is a perspective view illustrating an internal configuration of the air cleaning apparatus with a moist filter according to one embodiment of the present invention; FIG. 3 is a perspective view illustrating an upper body of the air cleaning apparatus with a moist filter according to one embodiment of the present invention, which is turned upside down; FIG. 4 is an enlarged exploded view illustrating a configuration of the rotational column included in the air cleaning apparatus with a moist filter according to one embodiment of the present invention; FIG. 5 is a longitudinal front-sectional view illustrating the air cleaning apparatus with a moist filter according to one embodiment of the present invention; and FIG. 6 is a transverse cross-sectional view illustrating a coupling condition of a water supply vessel and an injection column included in the air cleaning apparatus with a moist filter according to one embodiment of the present invention.

Referring to the above figures, the air cleaning apparatus with a moist filter 2 (hereinafter, 'air cleaning apparatus') according to one embodiment of the present invention may be operated such that: water stored in a bottom reservoir tank flows upward in a centrifugal manner; water molecules are finely cleaved in a microfine state and injected through multiple injection holes in the same centrifugal manner to become moist; under such conditions, water flowing into a rotational column, to which centrifugal force is applied, is filtered while circulating a cycle wherein external air inflowing through air input holes formed below a moist layer is adhered to water molecules in the moist layer and drops down, thereby enabling ultrafine dust as well as fine dust to be filtered with high efficiency and excellent economic advantages.

More particularly, the air cleaning apparatus 2 according to one embodiment of the present invention may include: a lower body 6 that is formed in a barrel shape and has a reservoir tank 18 on the bottom of the same;

a rotational column 30 that is coupled at a predetermined portion in the center of the lower body 6 to be rotatably mounted, lifts water stored in the reservoir tank 18 upward in a centrifugal manner and then scatters the same to form a moist layer 20;

a screen barrel 8 coupled to a top portion of the lower body 6 while enclosing an outer part of the rotational column 30; and an upper body 4 that is coupled to the top portion of the lower body 6 while enclosing an outer part of the screen barrel 8, has a rotational fan 50 exhausting internal air to the outside and a motor 48 mounted on the inner center thereof, and includes multiple air vents 10 formed on a top surface thereof.

The lower body 6 is a top-opened barrel, wherein the reservoir tank 18 to store water is provided on the bottom of the barrel. The rotational column 30 may rotate by rotary power of the motor 48 and lift the water stored in the reservoir tank 18 upward due to a difference in internal pressure of the rotational column 30 which is decreased by centrifugal force of the rotational column 30.

As shown in FIG. 4, the rotational column 30 may include: a water supply vessel 32 which lifts the water in the reservoir tank 18 upward while rotating; an injection column 38 which is engaged around an outer periphery on an upper part of the water supply vessel 32, and has multiple injection holes 40 formed around an outer periphery of the injection column 38; and a top cover 43 coupled to the top end of the water supply vessel 32 to fix the injection column 38.

In this regard, the water supply vessel 32 has a male thread member 37 on the top end of the same to couple the top end to the top cover 43, while a female thread member 41 is formed around an inner periphery of the top cover 43.

Further, the water supply vessel 32 may be configured in a top-opened column shape, and a water supply pipe 34 is mounted to pass through the bottom of the water supply vessel and is received in the same wherein a top end of the water supply pipe 34 is bent in a '⌐' shape and has an outlet 35 for supplying water formed therein.

Herein, the reason for bending the top end of the water supply pipe 34 in a '⌐' shape is that gravity is added to the centrifugal force applied to the outlet 35 so as to more quickly discharge the water, and tension of water further acts to accelerate lifting of the water through the water supply pipe 34. That is, the above defined shape may be proposed with application of the so-called 'siphon theory'.

Further, the water supply vessel 32 may include multiple water input holes 33 formed at a predetermined portion of the outer periphery on the top end of the vessel, so that centrifugal force generated by rotation of the water supply vessel 32 reduces an internal pressure of the water supply vessel 32 and, due to such a difference in pressure, the water in the reservoir tank 18 may be guided to flow upward through the water supply pipe 34.

Meanwhile, the water guided into the water supply vessel 32 strongly contacts the inner periphery of the water supply vessel 32 by the centrifugal force applied to the water supply vessel 32, and then, may be discharged to the outside through the water input holes 33.

In this case, the injection column 38 is engaged and coupled around an outer periphery on an upper part of the water supply vessel 32 and, as shown in FIG. 6, the water outflow through the water input holes 33 formed on the top end of the water supply vessel 32 may be firstly carried in a gap between the water supply vessel 32 and the injection column 38, that is, in an additional reservoir 36.

Preferably, an engaging shoulder is formed around the outer periphery in a middle part of the water supply vessel 32, in order to prevent the injection column 38 from moving up and down when coupled with the water supply vessel. More preferably, a gap between the water supply vessel 32 and the injection column 38 is kept to 0.5 mm in order to maintain desired pressure.

Under such conditions as described above, when the water supply vessel 32 continuously rotates while being coupled with the injection column 38, the water carried in the additional reservoir 36 may be under centrifugal force and injected to the outside through the injection holes 40, thereby enabling formation of a moist layer 20 inside the screen barrel 8.

The number of the injection holes 40 or a diameter of a hole may be freely altered.

When the water in the additional reservoir 36 is injected to the outside through the injection holes 40, an internal pressure of the additional reservoir 36 is decreased and, due to a difference in the internal pressure, the water stored in the reservoir tank 18 may pass through the water supply vessel 34 via the water supply pipe 34, and then may be lifted toward the additional reservoir 36.

The centrifugal force generated by rotation of the rotational column 30 may strongly discharge water molecules in the rotational column 30 to the outside through the injection holes 40. Therefore, the moist layer 20 substantially formed due to water molecules injected through the injection holes 40 based on Cohanna theory may continuously inject at least 2 million water molecules per second in layers.

As a result, the water molecules are electrically charged and fine dust may be more easily adhered to the charged water molecules. Based on the above theory, the air cleaning apparatus of the present invention may generate natural anions.

Meanwhile, air in the screen barrel 8 is forcibly exhausted by driving the rotational fan 50. Therefore, in order to repeatedly input external air into the screen barrel 8 by such forced-exhaustion as described above, an air input-punch band 16 may be provided around an outer periphery on top of the lower body 6 wherein multiple air input holes 14 are punched through the punch band.

In other words, since the air inflowing through the air input holes 14 contacts and is adhered to the moist layer 20 formed inside the screen barrel 8, fine dust or ultrafine dust included in the external air is firstly adhered to water molecules contained in the moist layer 20 and, due to an increase in weight, may drop into the reservoir tank 18.

In this case, the air contacting the moist layer 20 is adhered to the water molecules and thus may partially fall down and, on the other hand, may be partially exhausted to the outside through the rotational fan 50. Therefore, the air exhausted to the outside may include light weight water molecules without adhesion of fine dust and may become cleaner and more humidified air, compared to air obtained by conventional humidifiers.

In particular, since the water molecules injected through the injection holes 40 are strongly injected toward an inner wall of the screen barrel 8, the water molecules may be more easily adhered to the fine dust included in the air while the injected water collides with rising air during injection.

In this regard, a top end of the rotational column 30 and a bottom end of the rotational fan 50 may be coupled by first and second couplers 44 and 52, thereby rotating simultaneously by rotary power of the motor 48.

In other words, when electric power is applied to rotate the motor 48, the rotational fan 50 axially coupled to the motor 48 may rotate and exhaust air inflowing through the screen barrel 8 upward. Further, the first coupler 44 engaged with the second coupler 52 provided on the rotational fan 50 is provided on a top end of the rotational column 30, and therefore, the rotational column 30 may also rotate at the same rate of rotation as the rotational fan 50.

In fact, since moisture contained in the moist layer 20 is discharged to the outside by a single motor 48, the air cleaning apparatus 2 according to the present invention has humidification performance and, at the same time, may achieve air cleaning performance because of multi-filtering function embodied by a filter which is located inside the reservoir tank 18 and in which a lower part of the water supply pipe 34 is immersed.

Meanwhile, the upper body 4 of the air cleaning apparatus 2 according to one embodiment of the present invention may further include an operational panel 12 which has a power button, a speed set-up button to set a desired motor revolution rate ('rpm'), and a water shortage indicator LED to indicate lack of the water stored in the reservoir tank 18; and the reservoir tank 18 may further include a water level sensor (not shown) to detect a low level of the stored water.

When the rotational column 30 receives the rotary power of the motor 48 and rotates, centrifugal force is applied to the rotational column 30 and internal air is exhausted to the outside through the injection holes 40 formed around an outer periphery on an upper part of the rotational column 30. When the internal air is exhausted from the rotational column 30 to the outside, a pressure at the inner top of the rotational column 30 is reduced. That is, a pressure of the additional reservoir 36 placed between the water supply vessel 32 and the injection column 38 is reduced. Therefore, the same centrifugal force is also applied to the stored water in the additional reservoir 36 while rotating the rotational column 30. As a result, the water is forced toward and closely contacts the inner wall of the injection column 38. Similarly, when the water is injected outward through the injection holes 40, internal pressure of the additional reservoir 36 is reduced and, due to a difference in internal pressure, the stored water in the reservoir tank 18 may be lifted to the upper part of the water supply vessel 32 through the water supply pipe 34.

As such, the stored water in the reservoir tank 18 may be injected into the screen barrel 8 through the injection column 38 and falling water undergoes circulation again through the reservoir tank 18.

In this case, the rotational fan 50 rotates by the rotary power of the motor 48 and inputs external air toward a lower portion of the screen barrel 8. Rotation of the rotational fan 50 may move air upward via a space of the screen barrel 8 to thus exhaust the same to the outside. During this process, the air inflowing through the air input holes 14 contacts and is adhered to the moist layer 20 formed inside the screen barrel 8. Accordingly, fine dust or ultrafine dust included in the external air is firstly adhered to water molecules contained in the moist layer 20 and then, due to an increase in weight, falls into the reservoir tank 18.

In particular, since the water molecules injected through the injection holes 40 are strongly injected toward an inner wall of the screen barrel 8, the water molecules may be more easily adhered to the fine dust included in the air while the injected water collides with rising air during injection.

The water falling into the reservoir tank 18 is input again into the rotational column 30. Herein, a filter 42 for purifying water is disposed at a predetermined portion in the center of the reservoir tank 18 wherein a bottom end of the water supply pipe 34 is inserted into and housed in the filter 42.

Further, the filter 42 has a larger height than a water level and is configured to prevent non-purified water from being input into the filter 42.

Therefore, the water input upward through the water supply pipe 34 is entirely purified water passing through the filter 42, thereby secondly or further removing fine dust through the filter 42.

Briefly, the air cleaning apparatus 2 according to one embodiment of the present invention may repeatedly execute removal of pollutants as well as humidification several times by driving a single motor 48 only.

Preferably, the screen barrel 8 includes: a receiving part 22 in a circular band shape around an inner periphery on the bottom of the screen barrel, wherein sprayed water falling along the inner periphery from the upper part is received in the receiving part; and a guiding track 24 connected to the receiving part 22 to guide the water toward the center of the reservoir tank 18.

According to the above configuration, the water falling along the inner wall of the screen barrel 8 does not splatter or flow outward through the air input holes 14.

The air cleaning apparatus 2 according to one embodiment of the present invention uses an inner rotational column in a centrifugal manner and may moisturize water molecules with no further motor pump, and therefore, can achieve excellent economic advantage as well as reduction of noise. Further, the air cleaning apparatus of the present invention may pass air containing fine dust through a moist layer in order to execute first filtering, followed by second filtering through a cycle of circulating the water adhered to the moisture toward the rotational column, thereby achieving high efficiency of removing pollutants according to multi-filtering performance. Further, the air cleaning apparatus of the present invention may also have high safety with improved humidification performance since humidification is performed using clean moisture free of pollutants.

Unexplained symbol 46 denotes a cut-lined part to show the screen barrel 8.

Figure 7:
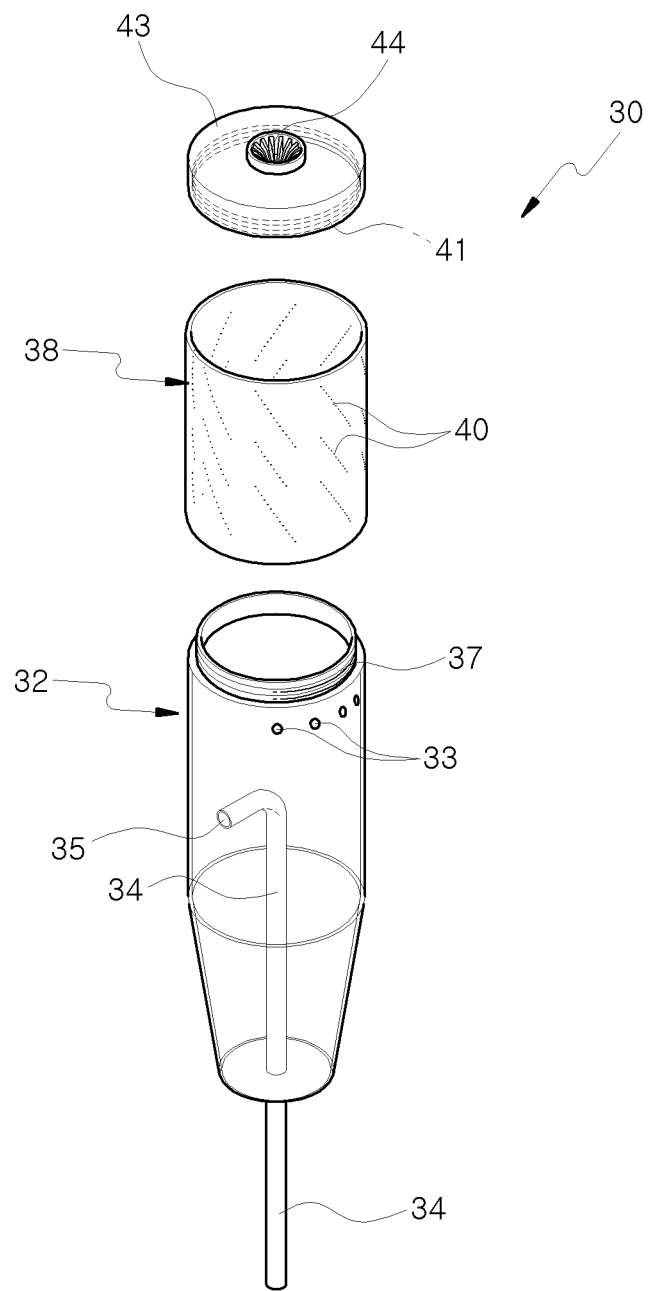
FIG. 7 is an enlarged exploded view illustrating another example of the injection column inside the rotational column included in the air cleaning apparatus with a moist filter according to one embodiment of the present invention.
Figure 8:
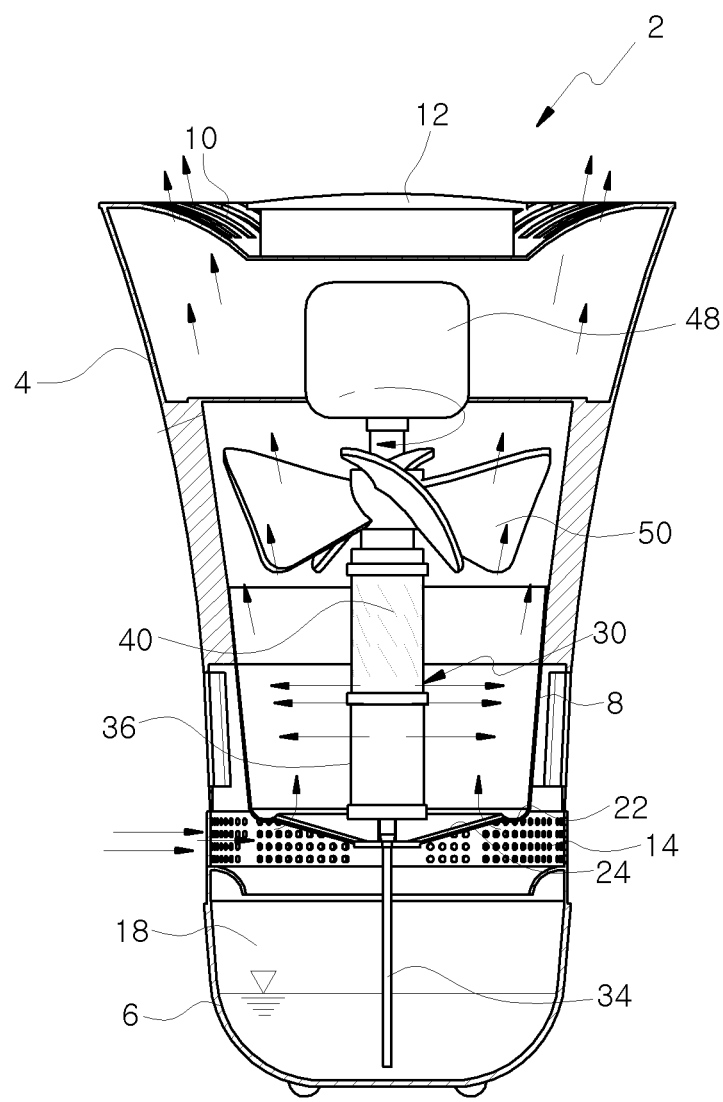
FIG. 8 is a longitudinal front-sectional view illustrating the air cleaning apparatus with a moist filter to which the configuration shown in FIG. 7 is applied.

Meanwhile, FIG. 7 is an enlarged exploded view illustrating another example of the injection column inside the rotational column included in the air cleaning apparatus with a moist filter according to one embodiment of the present invention; and FIG. 8 is a longitudinal front-sectional view illustrating the air cleaning apparatus with a moist filter to which the configuration shown in FIG. 7 is applied.

Referring to the above figures, there is illustrated another example of the injection column 38 coupled while enclosing the water supply vessel 32. Herein, the injection column 38 includes multiple injection holes 40 aligned and punched alongside one another to form a short and straight injection-hole line, wherein three of the injection-hole lines are spaced apart from one another and form an injection group together.

A plurality of injection groups may be provided along an outer periphery of the injection column 38.

Preferably, the injection-hole line includes 15 injection holes 40.

Further, the injection holes 40 may be punched such that the injection-hole line forms a diagonal line at a predetermined angle, and every injection-hole line may be aligned in parallel to one another.

The air cleaning apparatus with a moist filter according to the above embodiments of the present invention is not particularly limited to these embodiments, and those skilled in the art will appreciate that various modifications, additions and substitutions are possible, without departing from the scope and spirit of the invention as disclosed in the appended claims.

DESCRIPTION OF SYMBOLS IN THE DRAWINGS (2) Air cleaning apparatus with moist filter
(4) Upper body
(6) Lower body
(8) Screen barrel
(10) Air vent
(14) Air input hole
(18) Reservoir tank
(20) Moist layer
(22) Receiving part
(24) Guiding track
(30) Rotational column
(32) Water supply vessel
(33) Water input hole
(34) Water supply pipe
(38) Injection column
(40) Injection hole
(42) Filter
(48) Motor
(50) Rotational fan

What is claimed is:

1. An air cleaning apparatus with a moist filter, comprising:
    a lower body defined in a barrel shape, the lower body having a reservoir tank at a bottom of the lower body;
    a rotational column rotatably coupled at a predetermined portion in a center of the lower body, the rotational column being configured to lift water stored in the reservoir tank upward in a centrifugal manner and configured to scatter the water to have a moist layer;
    a screen barrel coupled to a top portion of the lower body, the screen barrel enclosing an outer part of the rotational column; and
    an upper body coupled to the top portion of the lower body, the upper body enclosing an outer part of the screen barrel,
    wherein the upper body has a rotational fan configured to exhaust internal air to an outside and a motor disposed at an inner center of the upper body, the motor being coupled to the rotational fan, and
    wherein the upper body includes multiple air vents disposed on a top surface of the upper body,
    wherein a top end of the rotational column is coupled with a bottom end of the rotational fan by first and second couplers, and the motor is thereby configured to simultaneously rotate both the rotational column and the rotational fan by rotary power of the motor.

2. The apparatus according to claim 1, wherein an air input-punch band is disposed on top of the lower body and wherein multiple air input holes are punched through the air input-punch band.

3. The apparatus according to claim 1, wherein the upper body further includes an operational panel which has a power button, a speed set-up button to set a motor revolution rate ('rpm'), and a water shortage indicator LED to indicate lack of the water stored in the reservoir tank; and
    the reservoir tank further includes a water level sensor to detect a low level of the water stored in the reservoir tank.

4. The apparatus according to claim 1, wherein the rotational column is configured to lift the water in the reservoir tank upward while rotating, the rotational column including:
    a water supply vessel that has water input holes punched at a predetermined portion on a top end of the water supply vessel, the water supply vessel having an engaging shoulder defined around an outer periphery in a middle part of the water supply vessel, to which an injection column is coupled and engaged;
    the injection column that is engaged around an outer periphery on an upper part of the water supply vessel, the injection column having multiple injection holes defined on the injection column; and
    a top cover coupled to the top end of the water supply vessel to fix the injection column,
    wherein an additional reservoir is disposed between the water supply vessel and the injection column, and a water supply pipe is disposed to pass through a bottom surface of the water supply vessel wherein a top end of the water supply pipe is bent in a ']' shape.

5. The apparatus according to claim 1, wherein the screen barrel includes:
    a receiver defined in a circular band shape around an inner periphery on a bottom of the screen barrel, wherein the receiver is configured to receive sprayed water falling along the inner periphery; and
    a guiding track connected to the receiver to guide the sprayed water toward a center of the reservoir tank.

6. The apparatus according to claim 1, further including a filter configured to purify water, the filter being disposed at a predetermined portion in a center of reservoir tank wherein a bottom end of a water supply pipe is inserted into and housed in the filter.

7. The apparatus according to claim 4, wherein a gap between the water supply vessel and the injection column is 0.5 mm.

8. The apparatus according to claim 4,
    wherein the multiple injection holes are aligned and punched alongside one another, the multiple injection holes defining a straight injection-hole line,
    wherein the straight injection-hole line has three injection-hole lines that are spaced apart from one another, the three injection-hole lines defining an injection group, and wherein a plurality of injection groups is defined on the injection column.

9. The apparatus according to claim 8, wherein the multiple injection holes are punched in a diagonal line at a predetermined angle, and injection-hole lines are aligned in parallel to one another.

* * * * *